United States Patent
Linden et al.

(10) Patent No.: US 6,684,482 B1
(45) Date of Patent: Feb. 3, 2004

(54) METHOD FOR PRODUCING AN ALTERNATOR ASSEMBLY HOUSING MEMBER

(75) Inventors: Dave Linden, Ann Arbor, MI (US); Jayeson Fougner, Ypsilanti, MI (US); Kevin Roy Harpenau, Ann Arbor, MI (US); Steven John Yockey, Ann Arbor, MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/879,596

(22) Filed: Jun. 12, 2001

Related U.S. Application Data

(62) Division of application No. 09/470,866, filed on Dec. 23, 1999, now Pat. No. 6,278,208.

(51) Int. Cl.[7] ................ H02K 15/00; H01R 43/06; F16C 19/50
(52) U.S. Cl. ............ 29/596; 29/597; 29/598; 29/527.5; 384/476; 384/905
(58) Field of Search ............... 310/89, 90, 91; 29/527.5, 527.6, 596, 597, 598, 602.1; 384/476, 905

(56) References Cited

U.S. PATENT DOCUMENTS

| | | | | |
|---|---|---|---|---|
| 3,995,357 A | * | 12/1976 | Boggs et al. | 164/103 |
| 4,952,078 A | * | 8/1990 | Ankenbauer et al. | 384/476 |
| 5,452,504 A | * | 9/1995 | Tatro et al. | 29/402.08 |
| 5,704,124 A | * | 1/1998 | Trauzettel | 29/447 |
| 5,911,515 A | * | 6/1999 | Allen et al. | 384/495 |
| 6,393,699 B1 | * | 5/2002 | Koenig | 29/898.06 |

* cited by examiner

*Primary Examiner*—Carl J. Arbes
*Assistant Examiner*—Thiem D Phan
(74) *Attorney, Agent, or Firm*—Visteon GlobalTech, Inc

(57) ABSTRACT

An alternator assembly 10 having a pair of housing members 11, 12 which cooperatively contain a stator 24, rotor 18, and bearing 29. The housing member 12 includes an integrally formed bearing sleeve member 40 which receives the bearing 29 and allows the rotor 18 to rotate within the assembly 10.

9 Claims, 2 Drawing Sheets

METHOD FOR PRODUCING AN ALTERNATOR ASSEMBLY HOUSING MEMBER

CROSS REFERENCE TO RELATED DOCUMENT

The present application is a division of application Ser. No. 09/470,866, now U.S. Pat. No. 6,278,208 which was filed on Dec. 23rd 1999.

FIELD OF THE INVENTION

This invention relates to an alternator assembly and more particularly, to an alternator assembly for use within a vehicle and which includes a selectively movable rotor which is supported by a bearing which is retained in the assembly by use of an integrally formed bearing sleeve member.

BACKGROUND OF THE INVENTION

Alternator assemblies are employed in many devices and/or apparatuses and are generally effective to selectively provide electrical current to many elements and/or components which are operatively contained within these devices and/or apparatuses.

Particularly, alternator assemblies typically include a selectively movable rotor which is movably contained or deployed within a housing. The housing typically includes and/or employs a stator which cooperates with the selectively movable rotor to provide electrical current and energy. While these alternator assemblies do provide electrical energy, they suffer from some drawbacks.

For example and without limitation, the housing of many alternator assemblies is typically formed from aluminum material and the rotor is typically formed from commercially available and conventional steel material. A "rear" steel bearing assembly having a first portion which is typically "press fit" into the "rear" or "back" alternator assembly housing and a second portion which is "press fit" onto the rotor shaft is usually employed to operatively support the rotor in the "rear" or "back" alternator assembly housing.

Since the thermal coefficient of expansion of aluminum is much greater than that of steel, a gap is typically formed between the first portion of the steel bearing assembly and the alternator housing which causes the contained rotor shaft to be unsecured or loosely secured within the rear or back alternator housing, thereby undesirably decreasing the overall performance of the alternator.

To address the previously delineated drawback, a material such as plastic or thermoplastic is typically formed into a cup and is placed over the first portion of the steel bearing assembly and is "fit" (e.g., press fit, transitionally fit, or slip fit) into the rear alternator assembly housing. The plastic material has a coefficient of expansion which is relatively larger than the aluminum material of the rear alternator assembly housing and selectively expands in order to "fill the gap" which is formed between the first portion of the steel bearing assembly and the alternator assembly housing. Alternatively, grooves are formed or "cut" into the first portion of the bearing assembly and the plastic material is selectively molded into these selectively formed grooves to form what is often referred to as "expansion coefficient bands". While the applied plastic material does provide for a more secure fit of the rotor shaft into the rear alternator assembly housing, the technique also suffers from several drawbacks.

For example and without limitation, the use of such a plastic cup or sleeve undesirably increases overall production cost and complexity. The use of selectively formed grooves also undesirably increases overall production costs. Further, the utilized plastic materials are relatively efficient insulators and undesirably prevent heat from being easily and efficiently dissipated from the bearing assembly, thereby undesirably decreasing the operating life of the bearing assembly and the alternator assembly. Further, the applied plastic material "creeps" and/or moves over time, thereby causing undesirable mis-alignment between the rotor and the stator.

To overcome these drawbacks, one attempt has been made to create and operatively use a steel cup which is selectively placed over the bearing assembly and which is selectively attached or fastened into the alternator assembly. While this steel cup overcomes the previously delineated "creep" and heat dissipation drawbacks, it requires several fasteners which increase the overall production cost and complexity of the production or manufacturing processes.

There is therefore a need for a new and improved alternator assembly which overcomes some or all of the previously delineated drawbacks of prior alternator assemblies.

SUMMARY OF THE INVENTION

It is a first object of the present invention to provide an alternator assembly which overcomes some or all of the previously described disadvantages of prior alternator assemblies.

It is a second object of the present invention to provide an alternator assembly which overcomes some or all of the previously described disadvantages of prior alternator assemblies and which, by way of example and without limitation, includes a steel bearing sleeve which is integrally formed within the alternator assembly housing and which operatively supports and receives a rotor bearing member, effective to allow the rotor to move within the housing and to allow the alternator assembly to provide electrical energy.

According to a first aspect of the present invention an alternator assembly is provided. The alternator assembly includes a rotor; and a housing which includes an integrally formed bearing sleeve member.

According to a second aspect of the present invention a method for making an alternator assembly housing is provided. The method includes the steps of providing a die; providing a sleeve member; placing the sleeve member into the die; creating the housing by use of the die, thereby producing an alternator assembly housing having an integrally formed sleeve member.

These and other aspects, features, and advantages of the present invention will become apparent by reading the following detailed description of the preferred embodiment of the invention, including the subjoined claims, and by reference to the following drawings.

DETAILED DESCRIPTION OF THE PREFERRED EMBODIMENT OF THE INVENTION

Figure 1:
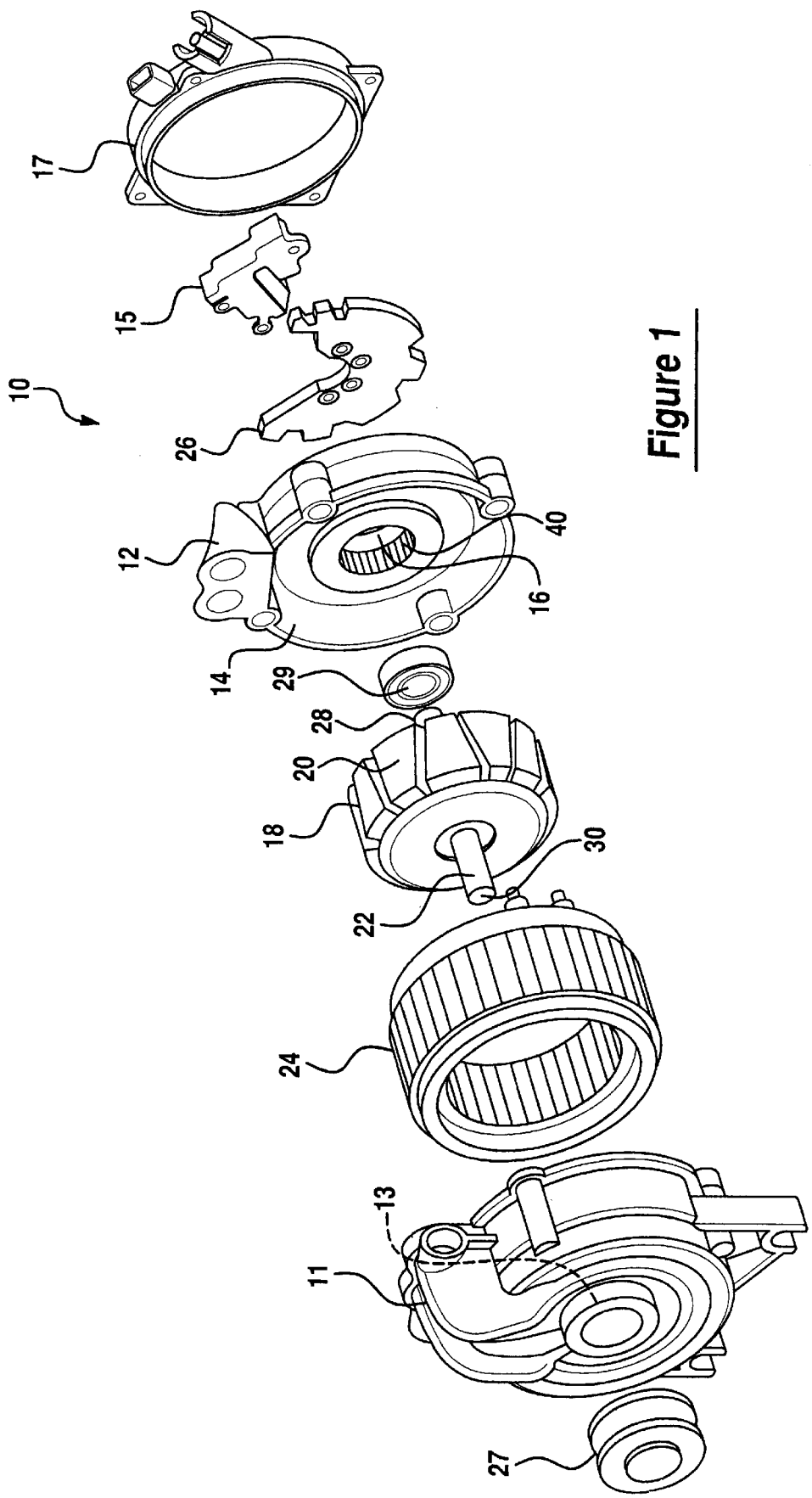
FIG. 1 is a perspective and unassembled view of an alternator assembly which is made in accordance with the teachings of the preferred embodiment of the invention.
Figure 2:
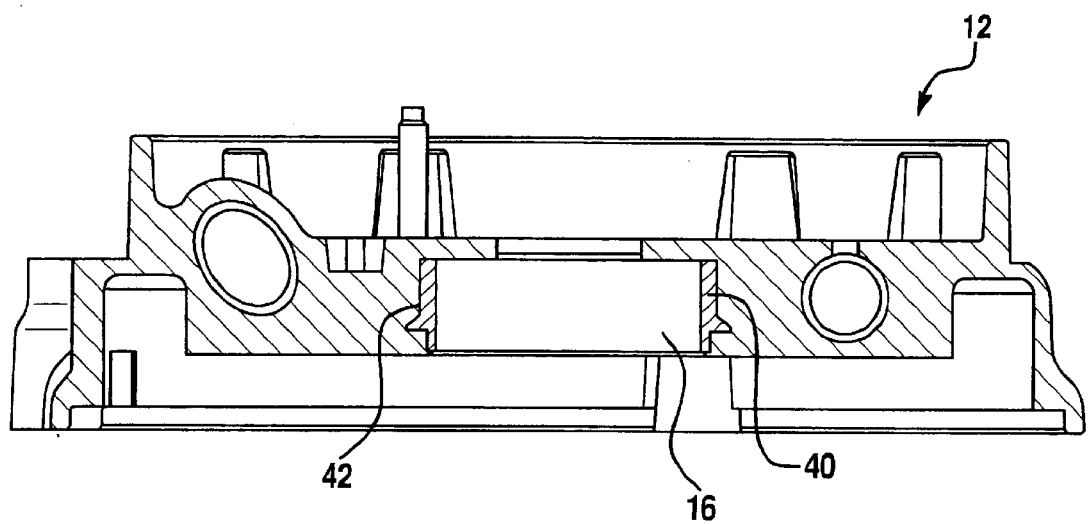
FIG. 2 is a side sectional view of the "rear" alternator assembly housing which is shown in FIG. 1.

Referring now to FIG. 1, there is shown an alternator assembly 10 which is made in accordance with the teachings of the preferred embodiment of the invention. It should be appreciated that although one type of vehicle alternator assembly 10 is shown in FIG. 1, other types of alternator assemblies may utilize the integrally formed bearing sleeve assembly of the present invention and that the present invention is not to be limited by any particular type of vehicle alternator assembly including the type of vehicle alternator assembly which is depicted within FIG. 1.

As shown, alternator assembly ("assembly") 10 includes a first generally round or "front" housing member 11 and a second or "rear" housing member 12 which each have a pair respective and cooperating rotor reception orifices 13, 16. Assembly 10 further includes a typical rotor 18 having several magnetic pole pieces or members 20 disposed upon a shaft 22, a stator member 24, a rectifier member 26, a belt driver or pulley 27, a bearing 29, a regulator 15, and a cover or cap portion or member 17.

Particularly, portion 28 of the shaft 22 is adapted to be received within and to traverse the bearing 29 and to be received within the rotor reception orifice 16. The rectifier 26, regulator 15, and rear housing 12 are operatively contained between the cap portion or member 17 and the rear housing 12. Portion 30 is adapted to be received within and to traverse the stator member 24 and the rotor reception orifice 11 of the front housing member or portion 13 before being received into the pulley or drive member 27. In this manner, the drive member 27, which is moved by a portion of the vehicle engine (not shown) selectively causes the rotor 18 to move, thereby producing electrical current and energy.

According to the teachings of the preferred embodiment of the invention, the rear or back alternator assembly housing member 12 includes an integrally formed bearing sleeve member 40 which is adapted to receive and to operatively contain the bearing 29. Particularly, integrally formed bearing sleeve member 40 is generally round and generally conforms to the size and the shape of and is positioned within the rotor reception orifice 16. Further, in one non-limiting embodiment, member 40 includes several skive portions 42 which outwardly project from the member 40 and into the housing 12, thereby further securing the member 40 within the housing 12. In a further non-limiting embodiment of the invention, member 40 is manufactured from commercially available and conventional steel material, thereby allowing heat to be readily dissipated from the rotor portion 28. The bearing sleeve member 40 is integrally formed within the member 12, thereby obviating the need for fasteners or other devices or members to separately attach member 40 to member 12 and thereby simplifying the overall assembly and production of the alternator assembly 10. The integral placement of the member 40 within the rear housing member 12 is shown best in FIG. 3.

Figure 3:
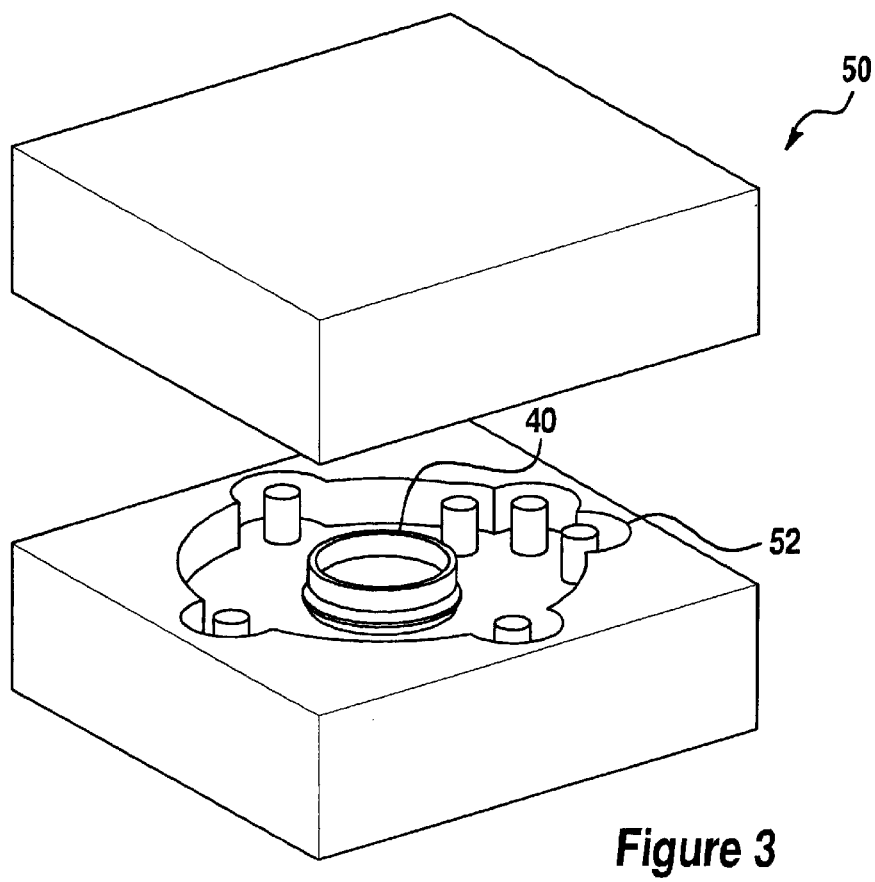
FIG. 3 is a perspective view of a die assembly which is used to make the rear alternator assembly housing which is shown in FIG. 2.

That is, as shown in FIG. 3, a typical casting die 50 is used to produce the rear housing member 12. Particularly, die 50 has a certain contoured cavity 52 which has a shape which corresponds to the overall shape and size of the member 12. Prior to casting, bearing sleeve member 40 is placed within the die and, more particularly, is placed within the portion of the cavity 52 corresponding to the rotor reception orifice 16. The member or housing 12 is cast while the bearing sleeve 40 resides within the cavity 52, thereby producing a rear alternator housing member 12 having an integrally formed bearing sleeve member 40 which resides within the rotor reception orifice 16 in the manner which has been previously delineated.

It should be realized that the invention is not limited to the exact method, construction, or embodiment which has been previously delineated, but that various changes and modifications may be made without departing from the spirit and the scope of the invention as is more fully set forth in the following claims.

What is claimed is:

1. A method for producing an alternator assembly housing member which selectively receives a bearing having an outer race, said method comprising the steps of:

providing a die;

causing said die to include a first surface in the form of said housing member;

placing a bearing sleeve member upon said die surface, wherein said bearing sleeve member is shaped to receive said outer race of said bearing and has a plurality of skive portions which outwardly project from said bearing sleeve member; and using said die to create said housing member, wherein said outwardly projecting skive portions project into said housing member, thereby forming said bearing sleeve member within said housing member.

2. The method of claim 1 wherein said housing includes a rotor reception portion and wherein said bearing sleeve member is formed within said rotor reception portion.

3. The method of claim 2 wherein said bearing sleeve member is formed from steel.

4. The method of claim 3 wherein said housing member is cast from aluminum.

5. The method of claim 1 wherein said bearing sleeve member is adapted to operatively contain a bearing.

6. A method for casting a housing member for an alternator assembly having a bearing with an outer race, said method comprising the steps of:

providing a die having a contoured cavity corresponding to a shape of said housing member, and including a portion corresponding to a rotor reception orifice;

providing a bearing sleeve member which is shaped to receive said outer race of said bearing and has a plurality of skive portions which outwardly project from said bearing sleeve member;

placing said bearing sleeve member within said portion of said cavity corresponding to said rotor reception orifice; and casting said housing member while said bearing sleeve member resides within said portion of said cavity corresponding to said rotor reception orifice, wherein said outwardly projecting skive portions project into said housing member, thereby integrally forming said bearing sleeve member within said housing member.

7. The method of claim 6 wherein said bearing sleeve member is manufactured from steel.

8. The method of claim 6 wherein said bearing sleeve member is adapted to operatively contain a bearing.

9. The method of claim 6 wherein said housing member is cast from aluminum.

* * * * *